United States Patent [19]
Nitta

[11] Patent Number: 5,494,735
[45] Date of Patent: Feb. 27, 1996

[54] COMPOSITE SYNTHETIC PAPER

[75] Inventor: Katsukuni Nitta, Tokyo, Japan

[73] Assignee: Oji Yuka Goseishi Co., Ltd., Tokyo, Japan

[21] Appl. No.: 309,088

[22] Filed: Sep. 20, 1994

[30] Foreign Application Priority Data

Feb. 21, 1994 [JP] Japan ................. 6-44767

[51] Int. Cl.$^6$ ............... B32B 5/16; B32B 27/10
[52] U.S. Cl. ............ 428/207; 428/218; 428/288; 428/325; 428/323; 428/331; 428/315.9; 428/910; 428/513
[58] Field of Search ................. 428/325, 331, 428/323, 288, 207, 513, 910, 218, 315.9

[56] References Cited

U.S. PATENT DOCUMENTS

| | | |
|---|---|---|
| 4,695,503 | 9/1987 | Liu et al. .............. 428/518 |
| 4,946,372 | 8/1990 | Auni .................... 428/513 |

FOREIGN PATENT DOCUMENTS 3-74180  11/1991  Japan .

*Primary Examiner*—P. C. Sluby
*Attorney, Agent, or Firm*—Oblon, Spivak, McClelland, Maier & Neustadt

[57] ABSTRACT

The invention provides composite synthetic paper comprising (A) plain weave fabric and (B) synthetic paper comprising a stretched resin film having an opacity of not less than 85%, a void volume of from 10 to 60%, and a thickness of from 30 to 500 μm, with or without (C) opacifying layer interposed between (A) and (B), in which synthetic paper (B) may be composed of a biaxially stretched thermoplastic resin film as a base layer and a uniaxially stretched thermoplastic film containing 8 to 65% by weight of an inorganic fine powder as a paper-like layer. The composite synthetic paper is excellent in printability, tear resistance, waterproofness, sewability, and opacifying properties and useful as material for aprons, shop curtains, disposable clothing, maps, outdoor posters, signboards, hangers, flags, etc.

9 Claims, 4 Drawing Sheets

COMPOSITE SYNTHETIC PAPER

BACKGROUND OF THE INVENTION

1. Field of the Invention

This invention relates to composite synthetic paper excellent in printability, tear resistance, waterproofness, sewing properties (sewability), and opacifying properties. The composite synthetic paper of the present invention is useful as material for aprons, shop curtains, disposable clothing, maps, outdoor posters, signboards, hangers, flags, etc.

2. Discussion of the Background

Synthetic paper comprising a biaxially stretched thermoplastic resin film as a base layer and a uniaxially stretched thermoplastic resin film containing an inorganic fine powder as a paper-like layer is described in U.S. Pat. No. 4,318,950; JP-B-46-40794 (the term "JP-B" as used herein means an "examined published Japanese patent application"); JP-B-50-29738; JP-B-50-28114; JP-B-53-6676; JP-B-52-30390; JP-A-54-74842 (the term "JP-A" as used herein means an "unexamined published Japanese patent application"); JP-A-56-21830; JP-A-56-118437; JP-A-56-141339; JP-A-57-149363 and JP-A-57-181829.

Coated paper with improved offset printability which is prepared by coating the above-mentioned synthetic paper with a surface modifier is also available. The surface modifier (primer) includes an aqueous solution of polyethyleneimine, a cationic or amphoteric acrylic polymer containing a tertiary or quaternary nitrogen atom, poly(ethylene-urea), an epichlorohydrin adduct of polyamide, etc., as disclosed in U.S. Pat. Nos. 4,097,645; 4,420,539 and 4,906,526.

Synthetic paper having such a multi-layered structure has high mechanical strength owing to its base layer comprising a biaxially stretched film, is light on account of numerous microvoids formed around inorganic fine particles in its paper-like layer and base layer on stretching, and has excellent ink absorption and ink adhesion due to fine cracks formed on the surface of the paper-like layer upon stretching. Due to these properties, it is useful in applications demanding durability, such as posters, maps, calendars, tracing paper, surface decorative materials, catalogues, labels, and so on.

Synthetic paper with a pearl-like surface comprising an inorganic fine powder-containing thermoplastic resin biaxially stretched film as a paper-like layer is also available (cf. JP-B-49-1782; JP-B-54-31032 and U.S. Pat. No. 3,775,521).

Synthetic paper comprising (1) a support composed of (1a) a biaxially stretched thermoplastic resin film as a base layer, (1b) a uniaxially stretched thermoplastic resin film containing 8 to 65% by weight of an inorganic fine powder as a surface layer, and (1c) a backing layer; (2) a transparent thermoplastic resin film containing no inorganic fine powder provided on surface layer (1b); and (3) a primer coat having an antistatic function provided on layer (2) is disclosed in JP-A-61-3748 and U.S. Pat. No. 4,663,216.

The above-mentioned synthetic paper comprising a stretched inorganic fine powder-containing resin film has a void volume of 10 to 40% and a density of 0.60 to 1.1 g/cm³. Such synthetic paper is commercially sold from Oji Yuka Goseishi Co., Ltd. under the tradenames of "YUPO FPG", "YUPO KPG", "YUPO SCG", "YUPO FBD", "YUPO SGE", and "YUPO GFG" and from BXL Co., G.B. under a tradename of "POLYART II".

However, the thermoplastic resin stretched film in the above-mentioned synthetic paper shows highly oriented crystallinity due to stretching at a stretch ratio of 4 to 8 in the machine direction and of from 5 to 12 in the transverse direction, with the orientation being mostly in two directions. Therefore, when applied to uses involving sewing, such as curtains, diaper covers and other waterproof products, if the direction of an external stress by a needle or a thread applied to the synthetic paper is the same as the orientation direction, the synthetic paper tears easily along the orientation direction.

Further, when the synthetic paper is perfected (printed on both sides) and used outdoors, for example as hanging posters, signboards, flags or shop curtains, the print on one side shows through and overlaps the print on the other side.

In order to overcome these defects, JP-B-3-74180 proposes sewable composite synthetic paper comprising (A) a fibrous sheet obtained by press heating non-woven fabric comprising short fibers or a fiber-reinforced sheet obtained by scattering a thermoplastic resin powder and/or laminating a thermoplastic resin sheet on that non-woven fabric followed by bonding together by press heating and having adhered thereon (B) a multi-layered synthetic paper composed of a biaxially stretched thermoplastic resin film as a base layer and a uniaxially stretched thermoplastic resin film containing 8 to 50% by weight of an inorganic fine powder as a paper-like layer, with the non-woven fabric layer of (A) as a back surface layer and the paper-like layer of (B) as a surface layer. This composite synthetic paper has been put to practical use as decorative paper, book covers, bookmarks, etc.

In the above-described composite synthetic paper, the non-woven fabric and the multi-layered synthetic paper are bonded with a solvent type adhesive or a hot-melt adhesive by means of pressure rollers so that the pattern of the non-woven fabric appears on the surface of the synthetic paper as an embossed pattern (appearance of a weave pattern on the surface will hereinafter be called strike-through). Such synthetic paper with a strike-through pattern is suitable as decorative paper, bookmarks or book covers as stated above. However, when this type of synthetic paper is printed for use as hangers, posters, signboards, etc., the strike-through pattern unfortunately reduces the gloss of the print.

SUMMARY OF THE INVENTION

An object of the present invention is to provide a sewable composite synthetic paper which has smooth printable surface.

Another object of the present invention is to provide composite synthetic paper which can be sewed, has excellent tear resistance, and, when printed on both sides thereof, the printed image on the opposite side does not show through.

The present invention now achieves these and other objects. A first embodiment of the present invention provides composite synthetic paper comprising (A) plain weave fabric having a basis weight of from 50 to 200 g/m² which is woven of warp threads of 40 to 150 denier at 50 to 140 ends per inch (2.54 cm) and weft threads of 40 to 150 denier at 50 to 140 picks per inch having adhered thereon (B) synthetic paper comprising a stretched resin film having an opacity of not less than 85%, a void volume of from 10 to 60% as calculated according to formula (1) shown below, and a thickness of from 30 to 500 μm.

$$Void\ Volume(\%) = (\rho_0 - \rho)/\rho_0 - 100 \tag{1}$$

wherein $\rho_0$ is a density of a film before stretching; and $\rho$ is a density of the film after stretching.

According to the first embodiment, the microvoids formed inside the synthetic paper relax the stress imposed from the woven fabric side on bonding of the woven fabric and the synthetic paper. The use of plain weave fabric, which is comparatively excellent in surface smoothness, prevents strike-through of the weave pattern on the surface side of the composite synthetic paper so that the synthetic paper retains its smoothness and suffers from no reduction in print gloss.

A second embodiment of the present invention provides composite synthetic paper having an opacity of 100% which comprises (A) plain weave fabric having a basis weight of from 50 to 200 g/m² which is woven of warp threads of 40 to 150 denier at 50 to 140 ends per inch and weft threads of 40 to 150 denier at 50 to 140 picks per inch having adhered thereon (B) synthetic paper comprising a stretched resin film having an opacity of not less than 85%, a void volume of from 10 to 60%, and a thickness of from 30 to 500 µm, with (C) an opacifying layer being interposed between (A) and (B).

According to the second embodiment, the microvoids formed in the synthetic paper and the opacifying layer prevent show-through of the printed image on the opposite side. The composite synthetic paper is therefore suitable as advertising display materials for outdoor use. Further, the existence of the woven fabric contributes to sewability with excellent tear resistance.

A third embodiment of the present invention provides composite synthetic paper comprising (A) plain weave fabric having a basis weight of from 50 to 200 g/m² which is woven of warp threads of 40 to 150 denier at 50 to 140 ends per inch and weft threads of 40 to 150 denier at 50 to 140 picks per inch having adhered on both sides thereof (B) multi-layered synthetic paper composed of (b-1) a biaxially stretched thermoplastic resin film as a base layer and (b-2) a uniaxially stretched thermoplastic resin film containing 8 to 65% by weight of an inorganic fine powder as a paper-like layer, with its paper-like layer as a surface layer on each side, the multi-layered synthetic paper (B) having an opacity of not less than 85%, a void volume of from 10 to 60%, and a total thickness of from 30 to 500 µm, with (C) an opacifying layer being interposed between (A) and at least one of the base layers of multi-layered synthetic paper (B).

According to the third embodiment, the plain weave fabric is not frayed when the composite synthetic paper is cut.

DETAILED DESCRIPTION OF THE INVENTION

Suitable woven fabric which can be used for imparting tear resistance and sewability to synthetic paper is plain weave fabric having a basis weight of from 50 to 200 g/m², preferably from 50 to 100 g/m², woven of the warp ($A_1$) and the weft ($A_2$) of 40 to 150 deniers, preferably 50 to 100 deniers, interlaced for every thread, the number of the warp threads and the weft threads being from 50 to 140 (ends or picks), preferably from 60 to 100, per inch.

The warp and weft to be used include yarn of nylon 6, nylon 6.6, polyethylene terephthalate, cotton, rayon, polyacrylonitrile, polyfluoroethylene, polypropylene, polyvinylidene fluoride, and the like.

The warp threads and weft threads may have the same or different fineness within the range of from 40 to 150 denier. From the standpoint of smoothness, they preferably have the same fineness. If desired, 1 or 2 warp threads and/or weft threads having a larger diameter than others may be interlaced per inch for the reinforcement.

Figure 6:
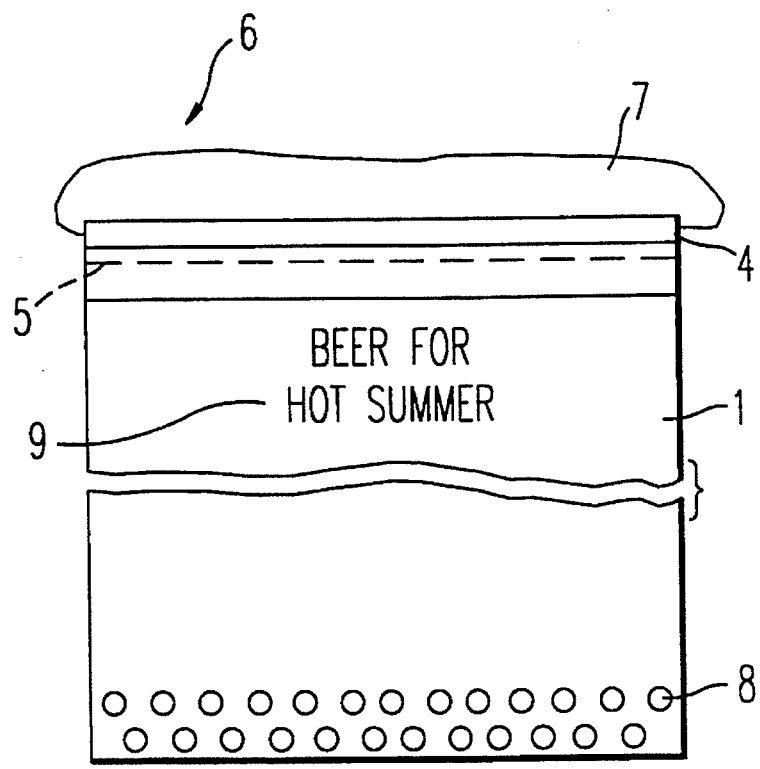
FIG. 6 is an illustration of a hanger made of the composite synthetic paper according to the present invention.

If the warp or weft has a fineness of less than 40 denier, the woven fabric becomes uneconomically costly. If the fineness exceeds 150 denier, the synthetic paper surface tends to show the pattern of the weave when press bonded, resulting in reduction in print gloss. Woven fabric having less than 50 ends or picks per inch may have high adhesive strength to the synthetic paper but contains too large spaces surrounded by each warp thread and each weft thread to prevent strike-through of the weave pattern on the surface of the synthetic paper, failing to provide high print gloss. On the contrary, if the woven fabric has more than 140 ends or picks per inch, the adhesive strength between the synthetic paper and the woven fabric is insufficient so that the composite synthetic paper as a hanger as shown in FIG. 6 or a signboard tends to undergo delamination on flapping in the wind.

The basis weight of the woven fabric usually ranges from 50 to 200 g/m², preferably from 50 to 100 g/m², though depending on the density, fineness, and the number of warp or weft threads.

Weaves of fabric include not only a plain weave but a twill weave, a satin weave, a knit weave, a diagonal weave, a polo weave, a lace weave, etc. The weaves other than a plain weave may be used for the purpose of imparting tear resistance, but a plain weave is most preferred so as not to cause strike-through.

Synthetic paper (B) is a finely porous stretched resin film having microvoids inside. Synthetic paper (B) has an opacity of not less than 85%, preferably not less than 90%, as measured according to JIS P-8138, a void volume of from 10 to 60%, preferably from 15 to 45%, and a thickness of from 30 to 500 µm, preferably from 50 to 300 µm. Such synthetic paper to be used in the present invention preferably include those described below [(1) to (3)], which can be prepared by known methods disclosed in the references. (1) Biaxially stretched microvoid-containing thermoplastic resin films containing 8 to 65% by weight of an inorganic or organic filler (cf. JP-B-54-31032 and U.S. Pat. Nos. 3,775,521; 4,191,719; 4,377,616; and 4,560,614; incorporated herein by reference). (2) Synthetic paper composed of a biaxially stretched thermoplastic resin film as a base layer and a uniaxially stretched thermoplastic resin film containing 8 to 65% by weight of an inorganic fine powder as a paper-like layer (cf. JP-B-46-40794; JP-A-57-149363; and JP-A-57-181829; incorporated herein by reference).

The structure of suitable synthetic paper according to the present invention can be a 2-layered structure, a 3-layered structure in which a uniaxially stretched film is laminated on each side of a base layer as a paper-like layer (cf. U. S. Pat. No. 4,318,950 and JP-B-46-40794; incorporated herein by reference), a 3- to 7-layered structure in which a different resin layer is interposed between a paper-like layer and a base layer (cf. JP-B-50-29738; JP-A-57-149363; JP-A-56-

126155; and JP-A-57-181829; incorporated herein by reference), and a multi-layered structure having 3 or more layers in which a heat sealing layer comprising a resin whose melting point is lower than that of the resin of the base layer, such as a propylene-ethylene copolymer, a metal (e.g., Na, Li, Zn or K) salt of an ethylene-(meth)acrylic acid copolymer or chlorinated polyethylene (cf. JP-B-3-13973; incorporated herein by reference).

Synthetic paper having a 3-layered structure comprises a biaxially orientated base layer and a uniaxially orientated microvoid-containing paper-like layer on each side of the base layer, which is prepared by, for example, stretching a thermoplastic resin film containing up to 50% by weight of an inorganic fine powder in one direction at a temperature lower than the melting point of that resin, laminating a thermoplastic resin molten film containing 8 to 65% by weight of an inorganic fine powder on each side of the resulting uniaxially orientated film, and stretching the laminate to the direction perpendicular to the above direction.

In order to improve offset printability, a water-soluble primer may be applied to the paper-like layer. The water-soluble primer can be selected from the group consisting of polyethyleneimine, poly(ethyleneimine-urea), an ethyleneimine adduct of polyamine polyamide, an epichlorohydrin adduct of polyamine polyamide, and an acrylic polymer containing a tertiary or quaternary nitrogen atom.

Figure 7:
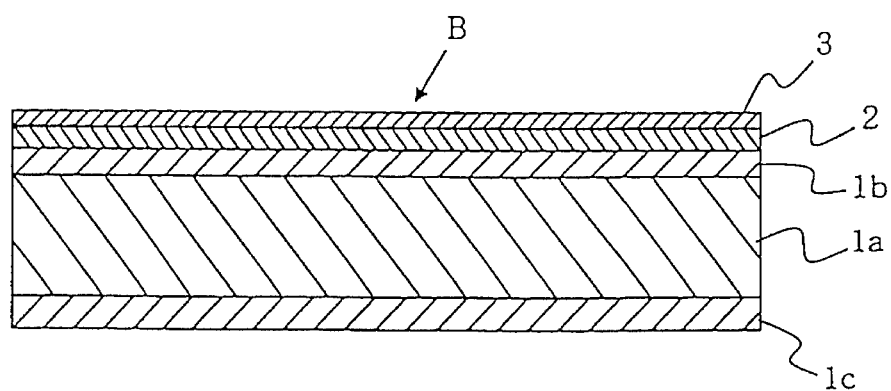
FIG. 7 is a cross section of synthetic paper (B) constituting the composite synthetic paper of the present invention.
Figure 8:
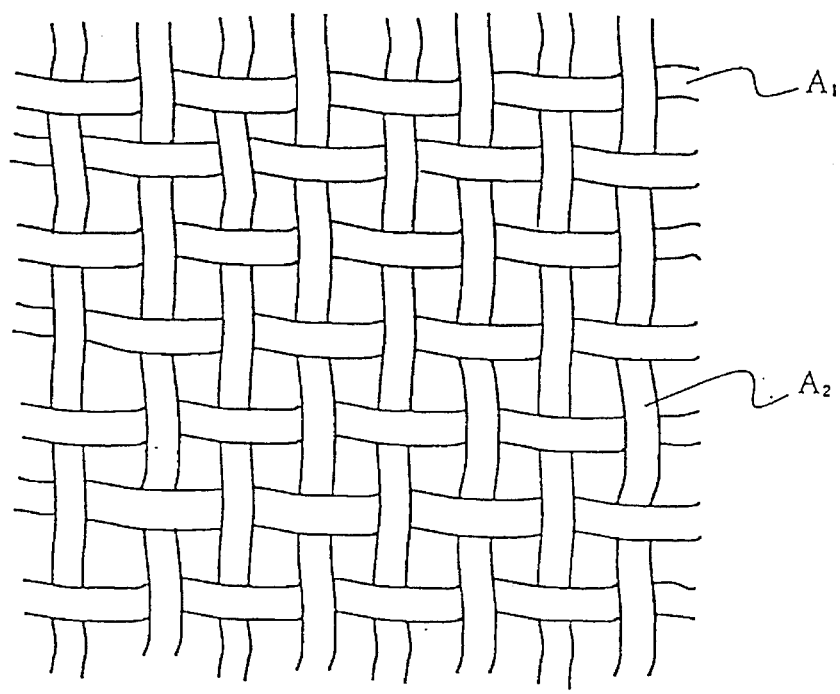
FIG. 8 illustrates the weave of plain weave fabric (A) constituting the composite synthetic paper of the present invention.

In the above-described synthetic paper, the base layer comprising a biaxially stretched film contributes to a strength balance in the machine and transverse directions, while the paper-like layer comprising a uniaxially stretched film offers a paper-like texture. (3) Printable synthetic paper with high gloss comprising the synthetic paper described in (2) above having further provided on the paper-like layer thereof a transparent thermoplastic resin laminate layer containing no inorganic fine powder and having a thickness of 0.1 to 20 μm (cf. JP-B-4-60437; JP-B-1-60411; and JP-A-61-3748; incorporated herein by reference). Included in this type is the synthetic paper shown in FIG. 7, which comprises a support composed of (1a) a base layer comprising a biaxially stretched thermoplastic resin film, (1b) a surface layer comprising a uniaxially stretched thermoplastic resin film containing 8 to 65% by weight of an inorganic fine powder, and (1c) a backing layer, the support having provided on the surface layer (1b) thereof (2) a transparent thermoplastic resin film containing no inorganic fine powder and further provided thereon (3) a primer coat having an antistatic function, as disclosed in JP-A-61-3748; incorporated herein by reference. Also included in this type is a synthetic paper composed of (1a) a base layer comprising a biaxially stretched thermoplastic resin film having provided on at least one side thereof a laminate of (1b) a uniaxially stretched thermoplastic resin film containing 8 to 65% by weight of an inorganic fine powder as a paper-like layer and (1c) a uniaxially stretched thermoplastic resin film as a surface layer, in which the thickness (t) of the surface layer (1c) and the average particle size (R) of the inorganic fine powder in the paper-like layer (1b) satisfy the relationship (2) shown below, as disclosed in JP-B-1-60411; incorporated herein by reference.

$$R > t > 1/10 \times R \quad (2)$$

Similarly to the synthetic paper (2), the synthetic paper (3) may further comprise a heat sealing layer on the back side thereof or the above-mentioned primer coat for improving printability on the side of the paper-like layer.

Suitable thermoplastic resins useful as materials in the synthetic paper include polyolefin resins, such as polyethylene, polypropylene, an ethylene-propylene copolymer, and poly(4-methylpentene-1); polystyrene; polyamide; polyethylene terephthalate; a particle hydrolysate of an ethylene-vinyl acetate copolymer; an ethylene-acrylic acid copolymer or a salt thereof; a vinylidene chloride copolymer, such as a vinyl chloride-vinylidene chloride copolymer; and mixtures of these resins. Polypropylene and polyethylene are preferred from the viewpoint of water resistance and chemical resistance. Where polypropylene is used as a base layer material, it is recommended to use it in combination with 3 to 25% by weight of a resin having a lower melting point than polypropylene, such as polyethylene, polystyrene or an ethylene-vinyl acetate copolymer, to thereby ensure satisfactory stretchability.

Suitable inorganic fine powder which can be incorporated into the thermoplastic resin includes calcium carbonate, calcined clay, silica, diatomaceous earth, talc, titanium oxide, and barium sulfate, each of which has a particle size of from 0.03 to 16 μm.

The stretch ratio is preferably 4 to 10 in each direction. The stretching temperature is, for example, from 145° to 157° C. for a propylene homopolymer (melting point: 164°–167° C.), from 110° to 120° C. for high-density polyethylene (melting point: 121°–124° C.), or from 104° to 115° C. for polyethylene terephthalate (melting point: 246°–252° C.). The stretching speed ranges from 50 to 350 m/min.

If the opacity of synthetic paper (B) is less than 85%, the effect of hiding the woven fabric is insufficient, and the print quality is poor. If the void volume of synthetic paper (B) is less than 10%, the effect of weight reduction is insufficient. If it exceeds 60%, the synthetic paper has insufficient strength (tensile strength and flexural strength) for practical use.

The thickness of synthetic paper (B) is from 30 to 500 μm. Finely porous synthetic paper with a thickness of less than 30 μm is difficult to produce. Synthetic paper having a thickness exceeding 500 μm is difficult to be supplied to the market in the form of a roll. That is, such thick paper must be cut to size, e.g., a medium octavo (218×152 mm) or an A3 size (420×298 mm), and packaged in paper for transportation.

The opacifying layer (C) which can be used in the present invention can be formed either by printing one side of synthetic paper (B) or woven fabric (A) in black all over to a thickness of 1 to 5 μm by offset printing or gravure printing or by applying an adhesive containing a large quantity (e.g., 5 to 75% by weight) of a white filler, such as titanium oxide whiskers or fine particles, between woven fabric (A) and synthetic paper (B) to a spread of 2 to 10 g/m².

Figure 1:
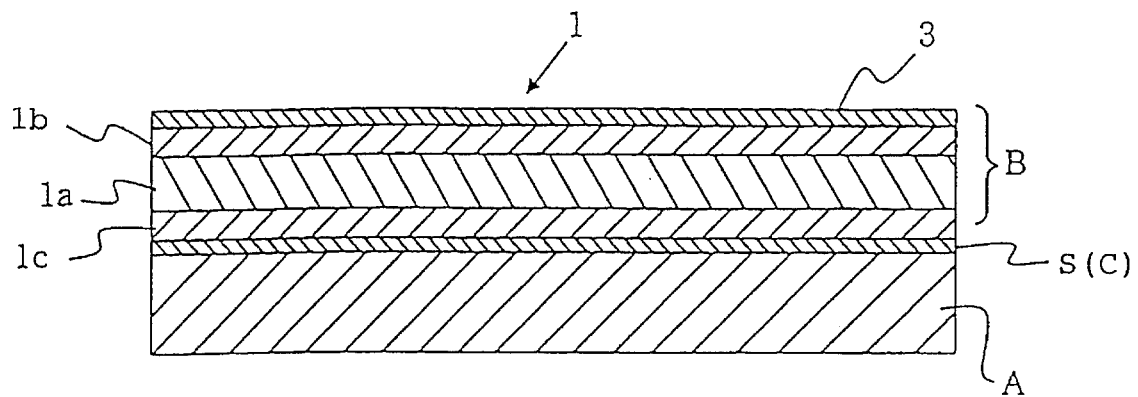
FIGS. 1 through 5 are each a cross section of the composite synthetic paper according to the present invention.

The composite synthetic paper of the present invention has such a structure that woven fabric (A) and synthetic paper (B) are bonded via an adhesive layer (S) comprising an adhesive or anchor coating agent or via an opacifying layer (C) comprising an adhesive containing a white filler as shown in FIG. 1 so that the advantages of both (A) and (B) may be fully appreciated.

Figure 2:
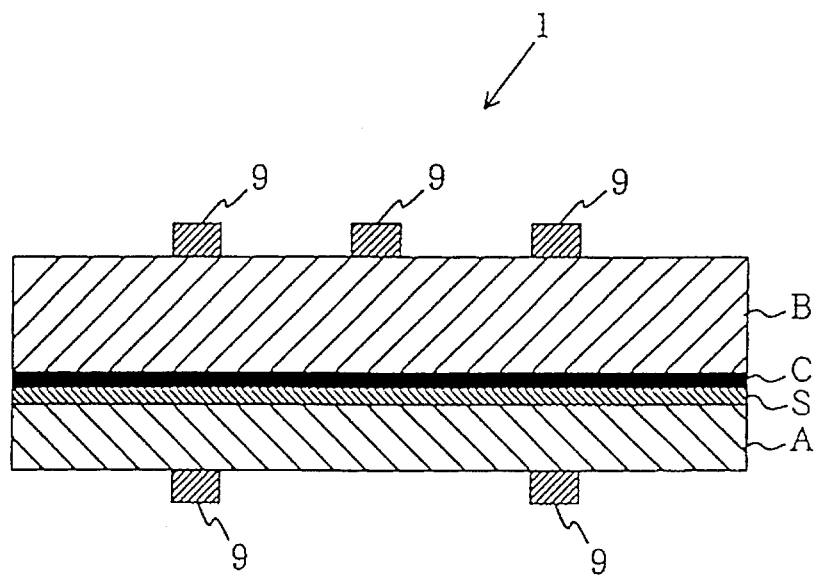
Figure 3:
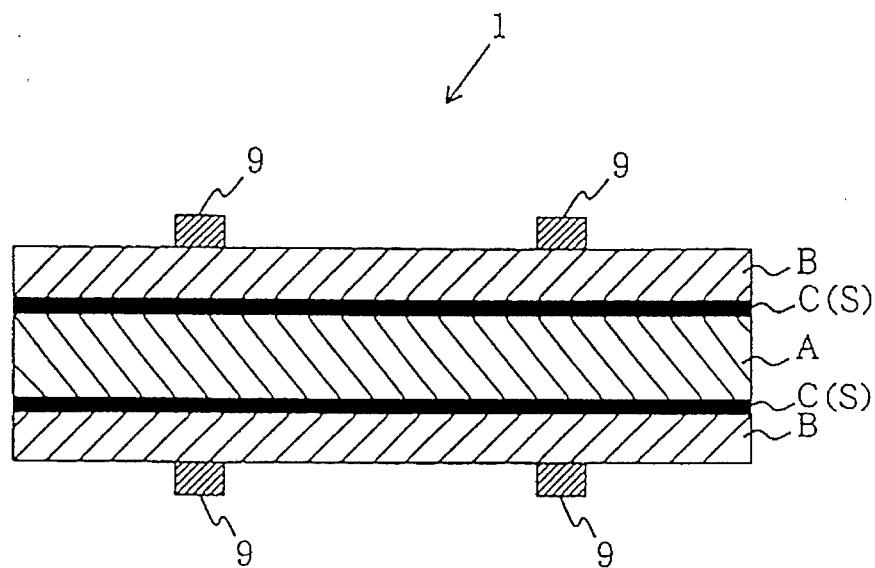
Figure 4:
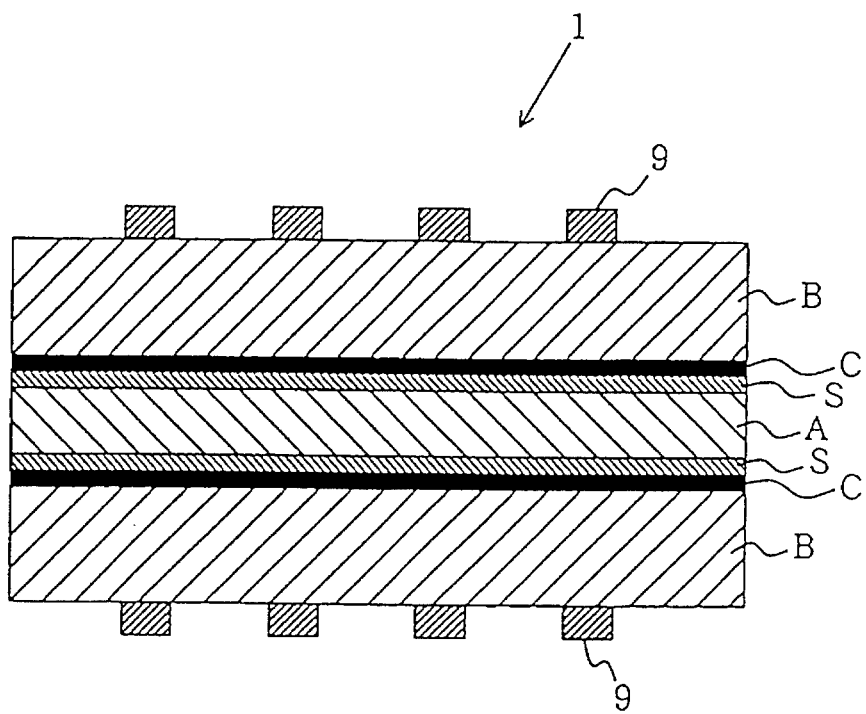
Figure 5:
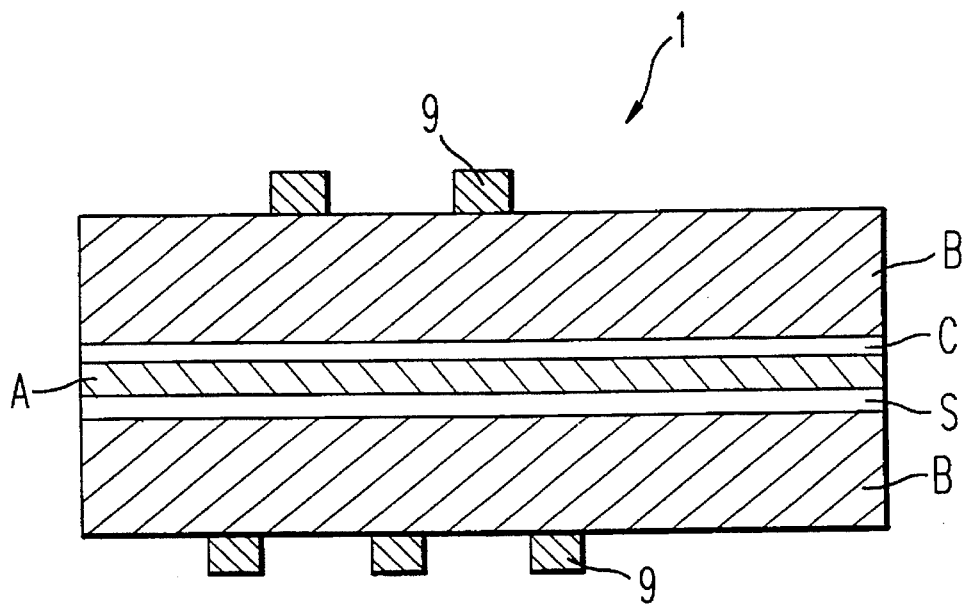

The composite synthetic paper may have an adhesive layer (S) and an opacifying layer (C) between woven fabric (A) and synthetic paper (B) as shown in FIG. 2.

Where synthetic paper (B) is provided on each side of woven fabric (A) as shown in FIGS. 3 to 5, the threads of woven fabric (A) can be prevented from being frayed at the cut edge. The composite synthetic paper according to this embodiment may have various layer structures, such as a structure of synthetic paper (B)/opacifying layer (C)/woven fabric (A)/opacifying layer (C)/synthetic paper (B) and a structure of (B)/adhesive layer (S)/(A)/(S)/(B) shown in FIG. 3, a structure of (B)/(C)/(S)/(A)/(S)/(C)/(B) shown in FIG. 4, and a structure of (B)/(C)/(A)/(S)/(B) shown in FIG. 5.

A liquid anchor coating agent can suitably be used in adhesive layer (S). Examples of commercially available anchor coating agents include polyurethane-based ones, such as "EL-150" and a mixture of "BLS-2080A" and "BLS-2080B", and polyester-based ones, such as "AD-503", all produced by Toyo Morton K.K. The anchor coating agent is applied to a spread of 0.5 to 25 g/m$^2$.

A hot-melt adhesive can also suitably be used in adhesive layer (S). The hot-melt adhesive includes an ethylene-vinyl acetate copolymer, low-density polyethylene, a metal salt of an ethylene-(meth)acrylic acid copolymer (so-called Surlyn), chlorinated polyethylene, and chlorinated polypropylene. The hot-melt adhesive to be used should have a lower melting point than the stretching temperature used in the preparation of synthetic paper (B). If a hot-melt adhesive is used at a temperature higher than that stretching temperature, synthetic paper (B) sometimes undergoes shrinkage.

In the case where woven fabric (A) and synthetic paper (B) are adhered with the above-mentioned anchor coating agent, the anchor coating agent is applied to either one or both of (A) and (B), and (A) and (B) are press bonded. Where a hot-melt adhesive is used, it is extruded through a die and laminated in a molten state on either one of (A) and (B), and the other is bonded thereto by means of pressure rollers.

The composite synthetic paper of the present invention usually has a total thickness of from 35 to 620 µm, preferably from 55 to 320 µm, while varying depending on the use.

The composite synthetic paper can be printed on its synthetic paper side and/or woven fabric side by offset printing, gravure printing, screen printing, flexographic printing, and the like.

The composite synthetic paper of the present invention can be sewed or punched. For example, as shown in FIG. 6, an end of composite synthetic paper (1) is wound around rod (4) with string (7) for hanging and stitched up (5) to prepare hanger (6). (8) represents punched holes and (9) represents print.

The present invention will now be illustrated in greater detail with reference to Examples, but it should be understood that the present invention is not construed as being limited thereto. All the parts are by weight unless otherwise indicated.

EXAMPLES

Synthetic paper (B-1) to (B-4) were prepared as follows.
Preparation of Synthetic Paper (B-1):
(1) A composition (A) consisting of 81% by weight of polypropylene having a melt flow rate (MFR) of 0.8 g/10 min and a melting point of from about 164° to 167° C., 3% by weight of high-density polyethylene, and 16% by weight of calcium carbonate having an average particle size of 1.5 µm was kneaded in an extruder set at 270° C., extruded into sheeting, and cooled in a cooling machine to obtain an unstretched sheet. The sheet was heated up to 150° C. and stretched in the machine direction at a stretch ratio of 5.

(2) A composition (B) consisting of 54% by weight of polypropylene having an MFR of 4 g/10 min and a melting point of about 164° to 167° C. and 46% by weight of calcium carbonate having an average particle size of 1.5 µm was kneaded in an extruder at 210° C., extruded through a die into sheeting, and laminated on both sides of the stretched film obtained in (1) above. The resulting three-layered laminate film was cooled to 60° C. and again heated to about 155° C., at which it was stretched in the transverse direction at a stretch ratio of 7.5 by means of a tenter, followed by annealing at 165° C. After cooling to 60° C., the laminate film was trimmed to obtain a multi-layered synthetic paper having a three-layered structure (uniaxially stretched film B/biaxially stretched film A/uniaxially stretched film B) having a total thickness of 80 µm (B/A/B=20 µm/40 µm/20 µm), a void volume of 33%, a density of 0.78 g/cm$^3$, and a bursting resistance of 7 kg/cm$^2$.

Both sides of the resulting three-layered synthetic paper was subjected to a corona discharge treatment. An antistatic agent aqueous solution (a primer) having the following composition was applied thereto at a single spread of 0.05 g/m$^2$ on a solid basis (corresponding to a thickness of about 0.1 µm on each side) and dried.

| Antistatic Agent Composition: | |
| --- | --- |
| An aqueous solution of an antistatic polyacrylic resin containing the followin unit in the molecular chain ("ST-1100", produced by Mitsubishi Petrochemical Co., Ltd.). | 100 parts |
| 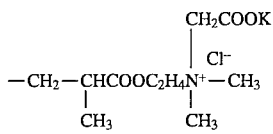 | |
| An epichlorohydrin adduct of a water-soluble polyamine polyamide ("KYMENE 557H", produced by Dick-Hercules) | 25 parts |

The thus obtained synthetic paper with a primer coating layer on both sides thereof was rolled up (designated (B-1)).

The coated layer of synthetic paper (B-1) had a surface gloss of 15% and a Bekk's smoothness of 680 seconds.
Preparation of Synthetic Paper (B-2):.
(1) A composition (A) consisting of 81% by weight of polypropylene having an MFR of 0.8 g/10 min and a melting point of from about 164° to 167° C., 3% by weight of high-density polyethylene, and 16% by weight of calcium carbonate having an average particle size of 1.5 µm was kneaded in an extruder set at 270° C., extruded into sheeting, and cooled in a cooling machine to obtain an unstretched sheet. The sheet was heated again to 140° C. and stretched in the machine direction at a stretch ratio of 5.

(2) A composition (B) consisting of 54% by weight of polypropylene having an MFR of 4.0 g/10 min and a melting point of about 164° to 167° C. and 46% by weight of calcium carbonate having an average particle size of 1.5 µm was kneaded in an extruder, extruded through a die into sheeting, and laminated on both sides of the stretched film obtained in (1) above. The resulting three-layered laminate film was cooled to 60° C. and again heated to about 160° C., at which it was stretched in the transverse direction at a stretch ratio of 7.5 by means of a tenter, followed by annealing at 165° C. After cooling to 60° C., the laminate film was trimmed to obtain a multi-layered synthetic paper having a three-layered structure (uniaxially stretched film B/biaxially stretched film A/uniaxially stretched film B) having a total thickness of 95 µm (B/A/B=24 µm/48 µm/23 µm), a density of 0.77 g/cm$^3$, an opacity of 93%, and a bursting resistance of 8 kg/cm$^2$. The void volume of B/A/B was 30%/33.7%/30%.

Both sides of the resulting three-layered synthetic paper was subjected to a corona discharge treatment. An antistatic agent aqueous solution having the same composition as used in synthetic paper (B-1) was applied thereto at a single spread of 0.05 g/m² on a solid basis and dried. The thus obtained synthetic paper with a primer coating layer on both sides thereof was rolled up (designated (B-2)).

The coated layer of synthetic paper (B-2) had a gloss of 16% and a Bekk's smoothness of 710 seconds.

Preparation of Synthetic Paper (B-3):

(1) A composition (A) consisting of 81% by weight of polypropylene having an MFR of 0.8 g/10 min and a melting point of from about 164° to 167° C., 3% by weight of high-density polyethylene, and 16% by weight of calcium carbonate having an average particle size of 1.5 μm was kneaded in an extruder set at 270° C., extruded into sheeting, and cooled in a cooling machine to obtain an unstretched sheet. The sheet was heated again to 145° C. and stretched in the machine direction at a stretch ratio of 5.

(2) A composition (B) consisting of 54% by weight of polypropylene having an MFR of 4.0 g/10 min and a melting point of about 164° to 167° C. and 46% by weight of calcium carbonate having an average particle size of 1.5 μm and a composition (C) consisting of 97% by weight of polypropylene having an MFR of 4.0 g/10 min and a melting point of from about 164° to 167° C. and 3% by weight of titanium oxide having an average particle size of 1.2 μm were separately kneaded in an extruder and extruded through a die into sheeting. The extruded sheet of composition (B) was laminated on both sides of the stretched film obtained in (1) above, and the extruded sheet of composition (C) was laminated on one side thereof. The resulting four-layered laminate film was cooled to 60° C. and again heated to about 150° C., at which it was stretched in the transverse direction at a stretch ratio of 7.5 by means of a tenter, followed by annealing at 163° C. After cooling to 60° C., the laminate film was trimmed to obtain a multi-layered synthetic paper having a four-layered structure (uniaxially stretched film C/uniaxially stretched film B/biaxially stretched film A/uniaxially stretched film B) having a total thickness of 95 μm (C/B/A/B=1 μm/24 μm/45 μm/25 μm), a density of 0.79 g/cm³, an opacity of 90%, and a bursting resistance of 9 kg/cm². The void volume of layers C/B/A/B was 0%/47%/16%/47%.

Both sides of the resulting four-layered synthetic paper was subjected to a corona discharge treatment. An antistatic agent aqueous solution having the same composition as used in synthetic paper (B-1) was applied thereto at a single spread of 0.05 g/m² on a solid basis (corresponding to a thickness of about 0.1 μm on each side) and dried. The thus obtained synthetic paper with a primer coating layer on both sides thereof (designated (B-3)) was rolled up.

The coated layer of synthetic paper (B-3) had a gloss of 90% and a Bekk's smoothness of 2800 seconds.

Preparation of Synthetic Paper (B-4):

A composition (A) consisting of 55% by weight of polypropylene having an MFR of 4.0 g/10 min and a melting point of from about 164° to 167° C., 25% by weight of high-density polyethylene, and 20% by weight of calcium carbonate having an average particle size of 1.5 μm was kneaded in an extruder set at 270° C., extruded into sheeting, and cooled in a cooling machine to obtain an unstretched sheet. The resulting sheet was heated again to 150° C. and stretched in the machine direction at a stretch ratio of 5.

The stretched film was again heated to 155° C., at which it was stretched in the transverse direction at a stretch ratio of 7.5 by means of a tenter, followed by annealing at 165° C. After cooling to 60° C., the laminate film was trimmed to obtain a biaxially stretched finely porous film having a thickness of 45 μm, a density of 0.88 g/cm³, an opacity of 86%, a bursting resistance of 3 kg/cm², and a void volume of 37%.

Both sides of the resulting biaxially stretched film was subjected to a corona discharge treatment. An antistatic agent aqueous solution having the same composition as used in synthetic paper (B-1) was applied thereto at a single spread of 0.05 g/m² on a solid basis (corresponding to a thickness of about 0.1 μm on each side) and dried. The thus obtained synthetic paper with a primer coating layer on both sides thereof (designated (B-4)) was rolled up.

The coated layer of synthetic paper (B-4) had a gloss of 33% and a Bekk's smoothness of 3800 seconds.

Woven Fabric (A):

Plain weave fabric made of polyester threads "TAFTA #6575" (product of Toray Industries, Inc.; warp: 75 denier; weft: 75 denier; 90 ends and 85 picks per inch; basis weight: 71 g/m²) was used.

Nonwoven Fabric:

A polyester non-woven sheet "SPUN BOND # UNISEL RT-0109W" (product of Teijin Ltd.; basis weight: 40 g/m²; thickness: 90 μm) was used.

The physical properties of synthetic paper (B-1 to B-4), woven fabric and non-woven fabric are shown in Table 1 below. The physical properties of these materials used and the composite synthetic paper hereinafter described were measured as follows.

1) Thickness Unevenness:

When the thickness of synthetic paper or composite synthetic paper varies from an average thickness, the thickness unevenness is defined as the absolute value of the maximum width varying from the average thickness.

2) Whiteness:

Measured in accordance with JIS L-1015.

3) Opacity:

Measured in accordance with JIS P-8138.

4) Surface Gloss:

The gloss of the surface side of synthetic paper was measured with a glossmeter "UGV-5DP", manufactured by Suga Shikenki K.K., at 75° C. in accordance with JIS P-8142.

5) Bekk's Smoothness:

Measured in accordance with JIS P-8119.

6) Clark Rigidity:

Measured in accordance with JIS P-8112.

7) Surface Resistance:

Measured in accordance with JIS K-6911.

8) Tensile Strength and Tensile Elongation:

Measured in accordance with JIS P-8113 and JIS P-8132.

9) Elmendorf Tear Strength:

Measured in accordance with JIS P-8116.

10) Bursting Resistance:

Measured in accordance with JIS P-8112.

11) Sewability:

Synthetic paper or composite synthetic paper that could be sewed with a sewing machine was rated "good", and ones that tore due to the tension of the thread were rated "poor".

12) Interlaminar Adhesive Strength:

The interlaminar adhesive strength between synthetic paper and woven or non-woven fabric was measured with a T-type peel tester.

13) Surface Appearance (Strike-through):

Whether the pattern of woven or non-woven fabric appears on the surface side of synthetic paper of the composite synthetic paper due to strike-through was observed with the naked eye.

14) Offset Printability (Ink Transfer and Ink Adhesion):

The surface side of the composite synthetic paper was printed in four colors (black, blue, red, and yellow) on an offset 4-color printing press (manufactured by Komori Insatsuki K.K.) by using offset inks "TSP-400" produced by Toyo Ink Mfg. Co., Ltd. The ink transfer and ink adhesion were evaluated as follows.

14-1) Ink Transfer:

The half tone dots of each color were observed with the naked eye through a magnifier (X30), and the half tone reproducibility was rated as follows.

| Half Tone Reproducibility: | 100 to 75% . . . good |
| | 75 to 50% . . . medium |
| | 50 to 0% . . . poor |

14-2) Ink Adhesion:

An adhesive tape "CELLOTAPE" (produced by Nichiban Co., Ltd.) was firmly adhered to the printed surface and rapidly stripped off along the printed surface. The ink retention on the paper was visually evaluated and rated as follows.

| Ink Receptivity: | 100 to 95% . . . good |
| | 95 to 80% . . . medium |
| | 80 to 0% . . . poor |

15) Opacifying Properties:

Both sides of the composite synthetic paper was printed on an offset press, and the printed paper was hung outdoor. The composite synthetic paper with no show-through was rated "good", and the ones with show-through were rated "poor".

of synthetic paper/adhesive layer/plain wave fabric. The synthetic paper (B-1) side of the resulting composite synthetic paper had a surface gloss of 22% and a Bekk's smoothness of 820 seconds. The surface side of synthetic paper (B-1) showed no weave pattern. The physical properties of the resulting composite synthetic paper are shown in Table 2 below.

COMPARATIVE EXAMPLE 1

A mixture of polyurethane-based anchor coating agents "BLS-2080A" and "BLS-2080B" was applied to one side of synthetic paper (B-1) at a dry base spread of 4 g/m$^2$, and non-woven fabric "Spun Bond # UNISEL RT-0109W" was adhered thereto by means of a pressure roller to obtain composite synthetic paper. The synthetic paper (B-1) side of the composite synthetic paper had a surface gloss of 10% and a Bekk's smoothness of 210 seconds. The surface side of synthetic paper (B-1) showed the weave pattern due to strike-through. The physical properties of the resulting composite synthetic paper are shown in Table2.

EXAMPLE 2

An adhesive consisting of 85 parts of a mixture of polyurethane-based anchor coating agents "BLS-2080A" and "BLS-2080B" and 15 parts of titanium oxide was applied to one side of synthetic paper (B-1) to a dry basis spread of 4 g/m$^2$, and plain weave fabric "TAFTA #6575" was adhered thereto by means of a pressure roller to obtain composite synthetic paper having a structure of synthetic paper/opacifying layer/plain weave fabric. The synthetic paper (B-1) side of the composite synthetic paper had a

TABLE 1

| | Synthetic Paper | | | | Plain Weave | Nonwoven |
| --- | --- | --- | --- | --- | --- | --- |
| | B-1 | B-2 | B-3 | B-4 | Fabric | Fabric |
| Average Thickness (μm) | 80.1 | 95.1 | 95.1 | 45.1 | 124 | 90 |
| Void Volume (%) | 33 | 32 | 30 | 37 | — | — |
| Basis Weight (g/cm$^2$) | — | — | — | — | 71 | 40 |
| Density (g/cm$^3$) | 0.78 | 0.77 | 0.79 | 0.88 | — | 0.27 |
| Thickness Unevenness (μm) | 3 | 4 | 4 | 5 | 8 | 38 |
| Whiteness (%) | 95 | 95 | 95 | 88 | 90 | 92.8 |
| Opacity (%) | 90 | 93 | 90 | 86 | 80 | 40 |
| Surface Gloss (%) | 15 | 16 | 90 | 33 | 10/10 | 8/8 |
| Bekk's Smoothness (sec) | 680 | 710 | 2800 | 3800 | 68 | 5 |
| Clark Rigidity (MD/TD) (S) | 23/42 | 34/60 | 25/44 | 8/9 | — | — |
| Surface Resistance (Ω) | <9 × 10$^{11}$ | <9 × 10$^{11}$ | <9 × 10$^{11}$ | <9 × 10$^{11}$ | <1.4 × 10$^{16}$ | 1.6 × 10$^{15}$ |
| Tensile Strength (MD/TD) (kg/15 mm) | 6/15 | 8/19 | 8/18 | 8/14 | ≧50/≧50 | 2.7/2.7 |
| Tensile Elongation (MD/TD) (%) | 100/25 | 108/25 | 110/26 | 110/26 | ≦10/≦10 | 62/48 |
| Elmendorf Tear Strength (90°) (g) | 138/255 | 165/290 | 170/302 | 84/84 | >10000/>10000 | 800/850 |
| Bursting Resistance (kg/cm$^2$) | 7 | 8 | 9 | 3 | >20 | >20 |
| Sewability | poor | poor | poor | poor | good | good |
| Ink Transfer | good | good | good | medium | — | — |
| Ink Adhesion | good | good | good | medium | — | — |
| Opacifying Properties | poor | poor | poor | poor | poor | poor |

EXAMPLE 1

A mixture of polyurethane-based anchor coating agents "BLS-2080A" and "BLS-2080B", both produced by Toyo Morton K.K., was applied to one side of synthetic paper (B-1) at a dry base spread of 4 g/m$^2$, and plain weave fabric "TAFTA #6575" was adhered thereto by means of a pressure roller to obtain composite synthetic paper having a structure surface gloss of 22% and a Bekk's smoothness of 820 seconds. No weave pattern appeared on the surface side of synthetic paper (B-1). The physical properties of the resulting composite synthetic paper are shown in Table 2.

TABLE 2

|  | Example 1 (B-1/adhesive layer/woven fabric) | Compara. Example 1 (B-1/adhesive layer/ nonwoven fabric) | Example 2 (B-1/C*/ Woven fabric) |
|---|---|---|---|
| Average Thickness (μm) | 208.1 | 174 | 208.1 |
| Basis Weight (g/m$^2$) | 148 | 107 | 148 |
| Density (g/cm$^3$) | 0.71 | 0.62 | 0.71 |
| Thickness Unevenness (μm) | 4 | 35 | 4 |
| Whiteness (%) | 95 | 96 | 96 |
| Opacity (%) | 95 | 92 | 100 |
| Surface Gloss (%) | 22 | 10 | 22 |
| Bekk's Smoothness (sec) | 820 | 570 | 820 |
| Clark Rigidity (MD/TD) (S) | 32/71 | 27/64 | 32/71 |
| Surface Resistance (Ω) | $<9 \times 10^{11}$ | $<9 \times 10^{11}$ | $<9 \times 10^{11}$ |
| Tensile Strength (MD/TD) (kg/15 mm) | $\geq 50/\geq 50$ | 7.5/15 | $\geq 50/\geq 50$ |
| Tensile Elongation (MD/TD) (%) | $\leq 10/\leq 10$ | 102/26 | 910/510 |
| Elmendorf Tear Strength (90°) (g) | >10000/ >10000 | 1035/1155 | >10000/ >10000 |
| Bursting Resistance (kg/cm$^2$) | >20 | 8 | >20 |
| Sewability | good | good | good |
| Interlaminar Adhesive Strength (g/25 mm) | 320 | 338 | 320 |
| Strike-through | not observed | observed | not observed |
| Ink Transfer | good | good | good |
| Ink Adhesion | good | good | good |
| Opacifying Properties | poor | poor | good |

Note: *Opacifying layer

EXAMPLES 3 TO 5

Composite synthetic paper was prepared in the same manner as in Example 1, except for replacing synthetic paper (B-1) with (B-2), (B-3) or (B-4). The physical properties of the resulting composite synthetic paper are shown in Table 3 below.

TABLE 3

|  | Example 3 | Example 4 | Example 5 |
|---|---|---|---|
| Average Thickness (μm) | 223.1 | 223.1 | 173.1 |
| Opacity (%) | 97 | 96 | 90 |
| Bekk's Smoothness (sec) | 680 | 3200 | 3780 |
| Elmendorf Tear Strength (90°) (g) | >10000/ >10000 | >10000/ >10000 | >10000/ >10000 |
| Sewability | good | good | good |
| Interlaminar Adhesive Strength (g/25 mm) | 280 | 330 | 170 |
| Strike-through | not observed | not observed | not observed |

EXAMPLE 6

One side of synthetic paper (B-1) was printed solid in black on an offset press to give a density of 1.65 (ink layer thickness: 2 μm), and the same plain weave fabric as used in Example 1 was adhered to the printed surface of the synthetic paper via a polyurethane-based anchor coating agent (spread: 2 g/m$^2$) to obtain composite synthetic paper having a structure of synthetic paper/solid-printed layer/adhesive/- plain weave fabric/solid-printed layer/synthetic paper, a total thickness of 290.2 μm, and an opacity of 100%.

EXAMPLES 7 TO 9

Composite synthetic paper was prepared in the same manner as in Example 6, except for replacing synthetic paper (B-1) with (B-2), (B-3) or (B-4). The physical properties of the resulting composite synthetic paper are shown in Table 4 below.

TABLE 4

|  | Example 7 | Example 8 | Example 9 |
|---|---|---|---|
| Average Thickness (μm) | 320.2 | 320.2 | 220.2 |
| Opacity (%) | 100 | 100 | 100 |
| Bekk's Smoothness (sec) | 680 | 3200 | 3780 |
| Elmendorf Tear Strength (90°) (g) | >10000/ >10000 | >10000/ >10000 | >10000/ >10000 |
| Sewability | good | good | good |
| Interlaminar Adhesive Strength (g/25 mm) | 280 | 330 | 170 |
| Strike-through | not observed | not observed | not observed |
| Opacifying Properties | good | good | good |

As described and demonstrated above, the composite synthetic paper according to the present invention is sewable and has high interlaminar adhesive strength and high tear resistance. In particular, the improvement in tear resistance is above the average of the synthetic paper and the woven fabric, indicating a synergic effect. The composite paper having an opacifying layer exhibits satisfactory lightscreening properties so that when it is printed on both sides thereof and used outdoor, the print on the opposite side is not shown through.

While the invention has been described in detail and with reference to specific examples thereof, it will be apparent to one skilled in the art that various changes and modifications can be made therein without departing from the spirit and scope thereof.

What is claimed is:

1. A composite synthetic paper comprising (A) a plain weave fabric having a basis weight of from 50 to 200 g/m² which is woven of warp threads of 40 to 150 denier at 50 to 140 ends per inch (2.54 cm) and weft threads of 40 to 150 denier at 50 to 140 picks per inch having adhered thereon (B) a synthetic paper comprising a stretched resin film having an opacity of not less than 85%, a void volume of from 10 to 60% as calculated according to formula (1):

$$\text{Void Volume } (\%) = (\rho)/\rho_0 \times 100 \qquad (1)$$

wherein $\rho_0$ is a density of a film before stretching; and $\rho$ is a density of the film after stretching; wherein said synthetic paper (B) has a thickness of from 30 to 500 μm.

2. The composite synthetic paper of claim 1, wherein said synthetic paper (B) is composed of a biaxially stretched thermoplastic resin film as a base layer and a uniaxially stretched thermoplastic resin film containing 8 to 65% by weight of an inorganic fine powder as a paper-like layer, wherein said paper-like layer is a surface layer.

3. A composite synthetic paper comprising (A) a plain weave fabric having a basis weight of from 50 to 200 g/m² which is woven of warp threads of 40 to 150 denier at 50 to 140 ends per inch (2.54 cm) and weft threads of 40 to 150 denier at 50 to 140 picks per inch having adhered on both sides thereof (B) a synthetic paper comprising a stretched resin film having an opacity of not less than 85%, a void volume of from 10 to 60% as calculated according to formula (1):

$$\text{Void Volume } (\%) = (\rho_0 - \rho)/\rho_0 \times 100 \qquad (1)$$

wherein $\rho_0$ is a density of a film before stretching; and $\rho$ is a density of the film after stretching; wherein said synthetic paper (B) has a thickness of from 30 to 500 μm.

4. A composite synthetic paper having an opacity of 100% which comprises (A) plain weave fabric having a basis weight of from 50 to 200 g/m² which is woven of warp threads of 40 to 150 denier at 50 to 140 ends per inch and weft threads of 40 to 150 denier at 50 to 140 picks per inch having adhered thereon (B) synthetic paper comprising a stretched resin film having an opacity of not less than 85%, a void volume of from 10 to 60% as calculated according to formula (1), and a thickness of from 30 to 500 μm, with (C) an opacifying layer being interposed between said plain weave fabric (A) and said synthetic paper (B), $$\text{Void Volume } (\%) = (\rho_0 - \rho)/\rho_0 \times 100 \qquad (1)$$

wherein $\rho_0$ is a density of a film before stretching; and $\rho$ is a density of the film after stretching.

5. The composite synthetic paper of claim 4, wherein said opacifying layer (C) comprises an adhesive containing from 5 to 75% by weight of a white filler.

6. The composite synthetic paper of claim 4, wherein said opacifying layer (C) is solid black print.

7. A composite synthetic paper comprising (A) a plain weave fabric having a basis weight of from 50 to 200 g/m² which is woven of warp threads of 40 to 150 denier at 50 to 140 ends per inch (2.54 cm) and weft threads of 40 to 150 denier at 50 to 140 picks per inch having adhered on both sides thereof (B) a multi-layered synthetic paper composed of (b-1) a biaxially stretched thermoplastic resin film as a base layer and (b-2) a uniaxially stretched thermoplastic resin film containing 8 to 65% by weight of an inorganic fine powder as a paper-like layer, with its paper-like layer as a surface layer on each side, the multi-layered synthetic paper (B) having an opacity of not less than 85%, a void volume of from 10 to 60% as calculated according to formula (1), and a thickness of from 30 to 500 μm, with (C) an opacifying layer being interposed between (A) and at least one of the base layers of multi-layered synthetic paper (B), $$\text{Void Volume } (\%) = (\rho_0 - \rho)/\rho_0 \times 100 \qquad (1)$$

wherein $\rho_0$ is a density of a film before stretching; and $\rho$ is a density of the film after stretching.

8. The composite synthetic paper of claim 7, wherein said opacifying layer (C) comprises an adhesive containing from 5 to 75% by weight of a white filler.

9. The composite synthetic paper of claim 7, wherein said opacifying layer (C) is solid black print.

* * * * *